June 30, 1931.  N. A. CHRISTENSEN  1,812,036
VEHICLE BRAKING APPARATUS
Filed Dec. 15, 1924
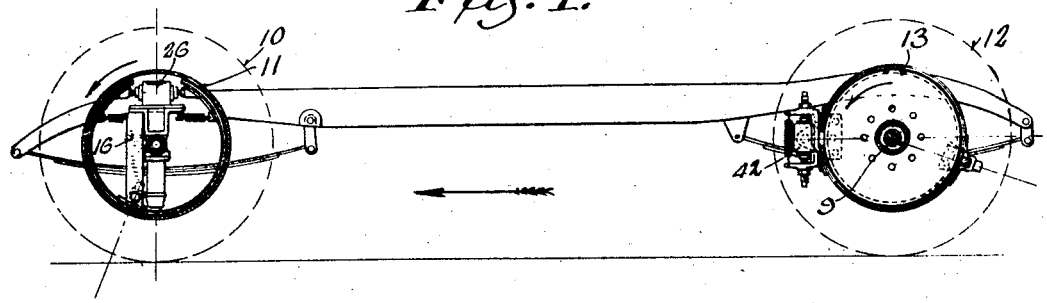
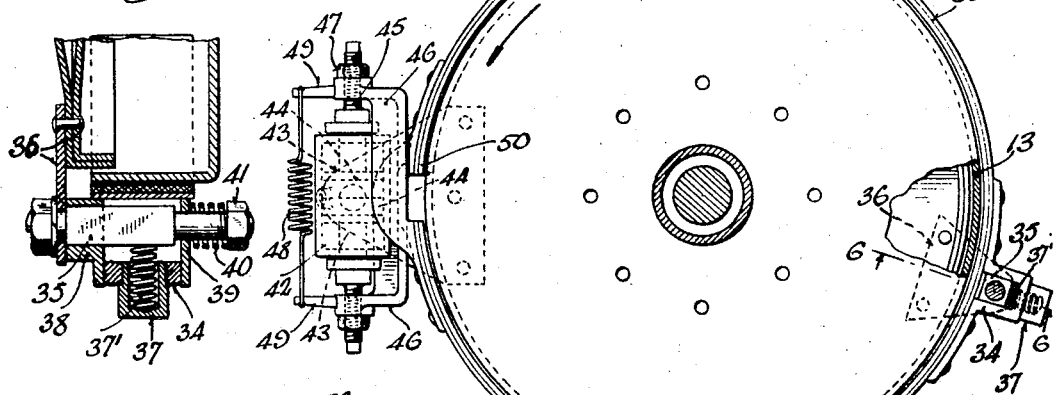
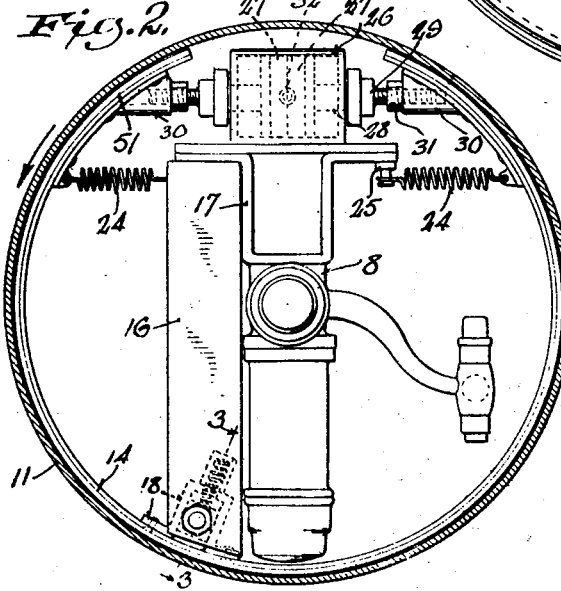
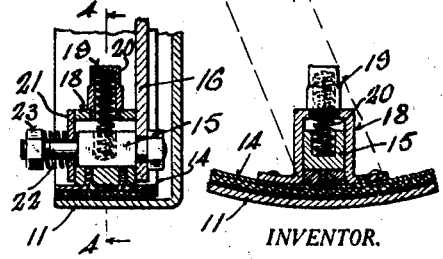
INVENTOR.
NIELS A. CHRISTENSEN.
BY
Quarles & French
ATTORNEYS.

Patented June 30, 1931

1,812,036

UNITED STATES PATENT OFFICE

NIELS A. CHRISTENSEN, OF MILWAUKEE, WISCONSIN

VEHICLE BRAKING APPARATUS

Application filed December 15, 1924. Serial No. 755,988.

The invention relates to vehicle braking apparatus, and more particularly to braking apparatus for use with automotive vehicles and trailers for such vehicles.

In the application of brakes to the front and rear sets of wheels of an automotive vehicle, it is desirable that less braking pressure be exerted by the brake members on the front wheels than on the rear, and I have found that this may be accomplished in a relatively simple manner by offsetting the anchor pins of the two sets of brakes relative to each other so that the brake members on the rear wheels have a greater braking pressure, due to self-application, than those on the front wheels when the vehicle is traveling in its usual direction, that is, forwardly. By this construction the same fluid-pressure-operated motors or actuators may be used with both sets of wheels at the same pressure and yet the total braking pressure applied to the front wheels will be less than that on the rear wheels.

The invention further consists in the several features hereinafter set forth and more particularly defined by claim at the conclusion hereof.

In the drawings: Fig. 1 is a view of braking apparatus embodying the invention, applied to a vehicle;

Fig. 2 is an enlarged side elevation view of the brake and brake-operating mechanism associated with the drum for the front wheel;

Fig. 3 is an enlarged detail sectional view taken on the line 3—3 of Fig. 2;

Fig. 4 is a sectional view taken on the line 4—4 of Fig. 3;

Fig. 5 is a view similar to Fig. 2, of the brake and brake-operating mechanism associated with the drum of the rear wheel.

Fig. 6 is a detail sectional view taken on the line 6—6 of Fig. 5.

In the drawings the numeral 8 designates the steering knuckle for the front wheel of the vehicle associated in the usual manner with the front axle, not shown, and 9 the rear axle. Each of the front wheels 10 carries a brake drum 11 and each of the rear wheels 12 carries a brake drum 13.

Associated with the brake drum 11 of the front wheel is a brake 14, here shown in the form of a band carried intermediate its ends on an anchor pin 15 which is connected to a supporting bracket 16 which is welded to a bracket 17 in turn welded to the steering knuckle 8, whereby the anchor pin is carried by the steering knuckle.

Figs. 3 and 4 show the connection of the anchor pin with the brake band, such connection comprising a yoke member 18 carried by the band and slidably engaging the flat sides of the anchor pin 15, said yoke member also carrying a screw cap 19, and a spring 20 is mounted in a bore in the anchor pin and in a bore in the cap 19, said spring serving to exert pressure on the yoke 18 and thereby move that portion of the band adjacent the anchor pin away from the drum to a release position. The yoke is yieldingly held against lateral movement by means of a plate 21 held against the yoke by a spring 22 and a nut 23 on the anchor pin.

The free ends of the brake shoe or band are normally held in a release position by springs 24 secured to said ends and to anchors 25 on the support 17. The band is moved into braking engagement with the drum by any suitable form of fluid-pressure-operated motor, the motor here shown comprising a brake cylinder 26 having suitably packed pistons 27 working therein and provided with piston rods 28 that are associated with jackscrews 29 adjustably secured in lugs 30 on the ends of the band and held in adjusted position by a locknut 31. The brake cylinder is mounted upon the bracket 17, and it will be noted that the brackets 16 and 17 form a means for supporting the brake mechanism upon the steering knuckle.

With the above construction, when compressed air is introduced through a central port 32 in the brake cylinder 26 the pistons 27 are moved outwardly, thereby moving the ends of the brake member into engagement with the drum and at the same time causing a sliding of the band relative to the anchor pin to produce a braking engagement of the entire band with the drum.

The braking apparatus here shown associated with the rear wheel includes a brake member 33 in the form of a band of the external contracting type engageable with the drum 13. The intermediate portion of the band has a yoke 34 in which the anchor pin 35 is slidably mounted. The anchor pin 35 is supported from a part 36 of the rear axle housing and, as in the previously described construction has flat sides to slidably engage the flat sides of the yoke. A cap 37 is carried by the yoke and a spring 37' is interposed between the anchor pin and a bore in the cap to normally move the intermediate members of the brake member to a release position.

The yoke 34 is guided laterally between a relatively fixed plate 38 and a plate 39 held against the yoke by a spring 40 and a nut 41 on the anchor pin 35.

The brake band 33 is drawn into braking engagement with the drum by a fluid-pressure-operated motor including a brake cylinder 42 and a pair of suitably packed pistons 43 working in said cylinder and having piston rods 44 which engage jackscrews 45 adjustably mounted in threaded engagement with arms 46 secured to the free ends of the band 33, said screws being secured in adjusted position by locknuts 47. The ends of the band are moved to a release position by a spring 48 connected to lugs 49 on the arms 46. As the band 33 is of an external contracting type, it will be noted that the arms 46 pass by each other so that pressure applied to these arms by the pistons of the motor, when air is introduced into the cylinder between said pistons, will act to draw the free ends of the arms into braking engagement with the drum, and this action also produces a pull of the intermediate portion of the band against the pressure of the spring 37 to cause a braking engagement of the band with the drum.

It will be noted from the drawings that the positions of the anchor pin of the brake bands of the front and rear wheels are offset relative to each other so that that portion of the band for the rear wheel between the anchor pin and the end 50, which is the portion that tends to apply itself due to the direction of rotation of the rear wheel, subtends a greater arc than that portion of the band of the front wheel between the anchor pin and the end 51 of this brake member. The total braking pressure on the band or brake shoe is the amount of braking pressure applied to those portions of the band on opposite sides of its anchor pin by the fluid-pressure-operated motor, and on the wrapping side or self-application side of the band this pressure is increased by the force exerted by the moving drum, hence it follows that since the tendency of the band on the rear wheel is to receive a greater amount of self-application pressure than that of the front wheel, the braking pressure applied by the band of the rear wheels will be greater than that applied by the bands of the front wheels, and this, it will be noticed, is accomplished by the relative offsetting of the anchor pins of the front and rear wheels with respect to opposite ends of said brake members.

It is to be understood that this invention is not to be limited to any particular form or arrangement of parts except in so far as such limitations are included in the claim or necessitated by the prior art.

What I claim as my invention is:

In vehicle braking apparatus, the combination with the front wheel and its brake drum, the rear wheel and its brake drum, of brake mechanism for said wheels, respectively, each brake mechanism including a fluid-pressure-operated motor, a brake engageable with its associated drum upon the actuation of said motor, and a support for each band including an anchor pin, the fluid-pressure-operated motors being of substantially equal capacity, that portion of the band of the front wheel on its advancing side between the anchor pin and its free end being less than that of its trailing side and having a less surface for braking engagement through self-application than that portion of the band for the rear wheel on its advancing side between its anchor pin and its free end, which advancing portion is greater than its trailing side, upon the forward travel of the vehicle so that for substantially equal pressure from said motors a greater braking force is applied to the rear wheel than to the front wheel.

In testimony whereof, I affix my signature.

NIELS A. CHRISTENSEN.